US011592210B2

(12) United States Patent
Moskowitz

(10) Patent No.: US 11,592,210 B2
(45) Date of Patent: Feb. 28, 2023

(54) SYSTEM AND METHOD FOR PROVIDING HEATED WATER TO SABBATH OBSERVERS

(71) Applicant: Max Moskowitz, Flushing, NY (US)

(72) Inventor: Max Moskowitz, Flushing, NY (US)

( * ) Notice: Subject to any disclaimer, the term of this patent is extended or adjusted under 35 U.S.C. 154(b) by 0 days.

(21) Appl. No.: 17/340,758

(22) Filed: Jun. 7, 2021

(65) Prior Publication Data

US 2021/0381723 A1 Dec. 9, 2021

Related U.S. Application Data

(60) Provisional application No. 63/035,839, filed on Jun. 8, 2020.

(51) Int. Cl.
| | |
|---|---|
| *F24H 9/20* | (2022.01) |
| *F24H 1/06* | (2022.01) |
| *F24H 1/18* | (2022.01) |
| *F24H 9/00* | (2022.01) |
| *F24H 9/14* | (2006.01) |
| *F24H 1/20* | (2022.01) |

(52) U.S. Cl.
CPC ............. *F24H 9/2021* (2013.01); *F24H 1/06* (2013.01); *F24H 1/181* (2013.01); *F24H 9/0005* (2013.01); *F24H 9/142* (2013.01); *F24H 1/201* (2013.01)

(58) Field of Classification Search
CPC ...... A47J 31/50; A47J 31/21008; A47J 31/56; F24H 9/142; F24H 9/005; F24H 9/2021; F24H 1/06; F24H 1/181; F24H 1/201; B67D 7/0216; B67D 7/002; B67D 7/0288
See application file for complete search history.

(56) References Cited

U.S. PATENT DOCUMENTS

| | | | | |
|---|---|---|---|---|
| 360,014 | A | * 3/1887 | Hargreaves | ........... D06F 39/008 68/207 |
| 3,738,351 | A | * 6/1973 | Watts | ........................ F24H 1/08 122/18.3 |
| 5,290,442 | A | * 3/1994 | Clack | ..................... B01D 61/10 210/257.1 |
| 5,979,775 | A | * 11/1999 | Raya | .................. G05D 23/1393 236/12.12 |
| 6,703,591 | B2 | 3/2004 | Daum et al. | |
| 6,826,267 | B2 | 11/2004 | Daum et al. | |
| 7,561,977 | B2 | 7/2009 | Horst et al. | |
| 7,672,576 | B2 | 3/2010 | Grossbach et al. | |

(Continued)

FOREIGN PATENT DOCUMENTS

WO WO-2017094034 A1 * 6/2017

*Primary Examiner* — Steven S Anderson, II
(74) *Attorney, Agent, or Firm* — Ostrolenk Faber LLP

(57) ABSTRACT

A water supply system includes a main water tank that is configured to store water and includes a heater to heat the stored water to close to but below a boiling temperature thereof, to provide main heated water. A dispenser water tank receives a portion of the main heated water, and is free of any heating elements to add heat to the water stored therein, and providing dispensable heated water. A water mixer includes a first pipe for receiving the dispensable heated water from the dispenser tank and a second pipe for receiving utility water from a faucet that supplies utility-provided water, with a mixing chamber from which the waters from the first pipe and the second pipe are dispensed and/or in which these waters are admixed.

20 Claims, 5 Drawing Sheets

(56) References Cited

U.S. PATENT DOCUMENTS

| | | |
|---|---|---|
| 7,965,178 B1 | 6/2011 | Schmuttor et al. |
| 7,970,264 B2 | 6/2011 | Grossbach et al. |
| 7,974,527 B1 * | 7/2011 | Adler .................. F24H 1/185 99/275 |
| 8,255,090 B2 | 8/2012 | Frader-Thompson et al. |
| 8,403,033 B2 | 3/2013 | Ahern, Jr. |
| 8,669,501 B2 | 3/2014 | Frommer |
| 8,844,304 B2 | 9/2014 | Peretz |
| 8,915,091 B2 | 12/2014 | Goenka |
| 8,996,188 B2 | 3/2015 | Frader-Thompson et al. |
| 9,321,623 B2 * | 4/2016 | Raoven ............... B67D 3/0045 |
| 9,408,282 B1 | 8/2016 | Springer |
| 9,651,243 B1 | 5/2017 | Springer |
| 9,666,914 B2 | 5/2017 | Bell et al. |
| 9,709,075 B2 | 7/2017 | Yakuel et al. |
| 9,784,417 B1 | 10/2017 | Springer |
| 9,863,672 B2 | 1/2018 | Goenka |
| 9,920,888 B1 | 3/2018 | Springer |
| 10,106,011 B2 | 10/2018 | Goenka |
| 10,295,248 B2 | 5/2019 | Miller et al. |
| 10,409,236 B2 | 9/2019 | Cohen |
| 10,557,876 B2 | 2/2020 | Frader-Thompson et al. |
| 2002/0053549 A1 * | 5/2002 | Voll .................. B01D 19/0005 210/194 |
| 2004/0187862 A1 * | 9/2004 | Cobos, Jr. .............. F24S 60/30 126/657 |
| 2006/0005713 A1 * | 1/2006 | Soryas .................... A47J 31/50 99/275 |
| 2006/0180179 A1 | 8/2006 | Roderer et al. |
| 2007/0051819 A1 | 3/2007 | Isaacson |
| 2007/0261561 A1 | 11/2007 | Grossbach et al. |
| 2009/0103907 A1 | 4/2009 | Nave |
| 2012/0095614 A1 | 4/2012 | DeLayo |
| 2013/0253725 A1 | 9/2013 | Ezra |
| 2017/0208650 A1 | 7/2017 | Davis |
| 2018/0245802 A1 | 8/2018 | Tadmor |
| 2018/0310748 A1 | 11/2018 | Haroni |
| 2021/0381723 A1 * | 12/2021 | Moskowitz ............. A47J 31/56 |

* cited by examiner

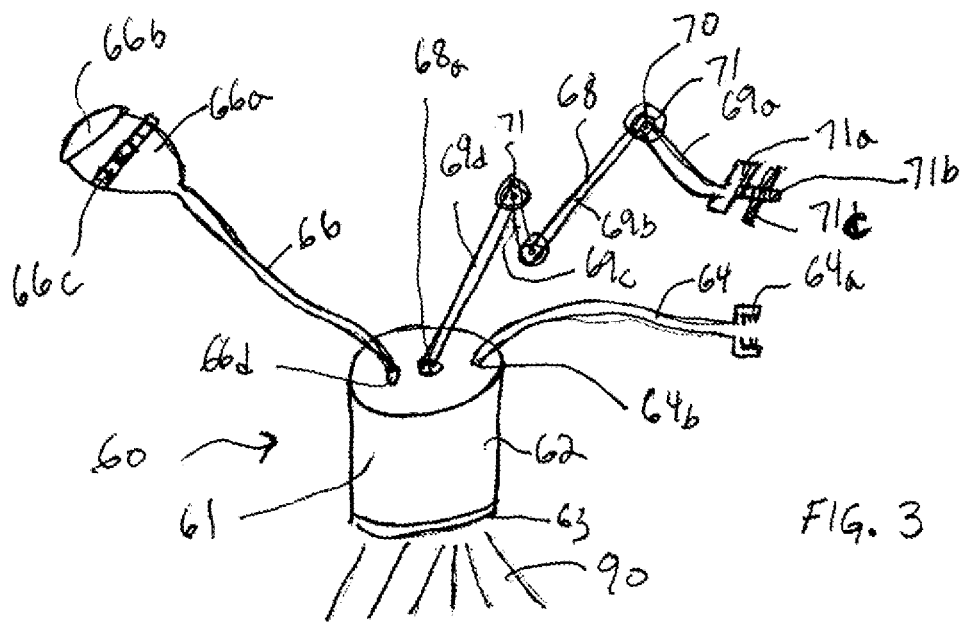
FIG. 3
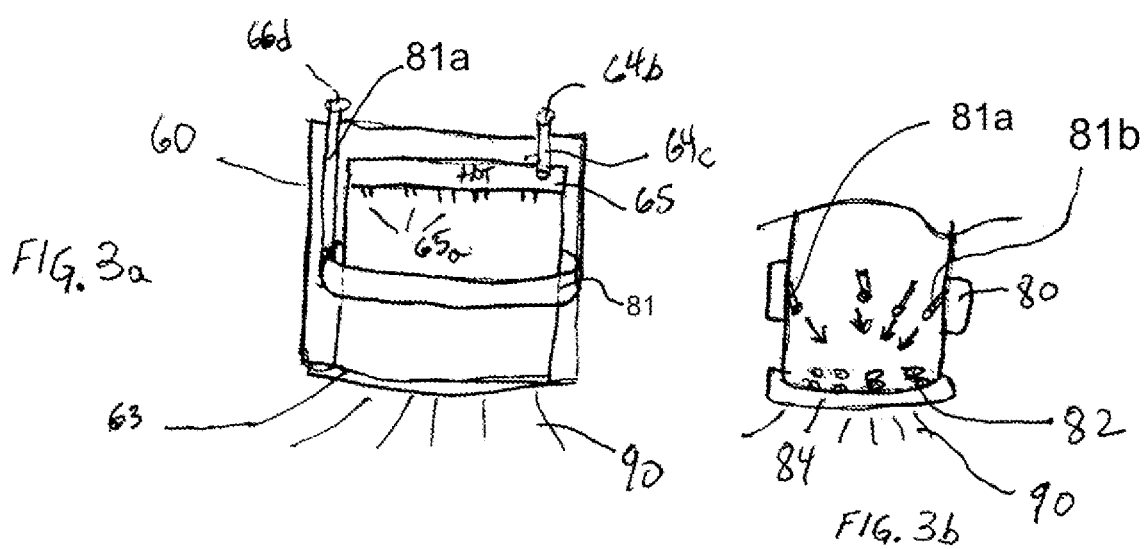
FIG. 3a
FIG. 3b

SYSTEM AND METHOD FOR PROVIDING HEATED WATER TO SABBATH OBSERVERS

CROSS-REFERENCE TO RELATED APPLICATION

The present non-provisional patent application claims the benefit of and priority to U.S. Provisional Patent Application No. 63/035,839, filed Jun. 8, 2020, the entire contents of which are incorporated herein by reference.

BACKGROUND OF THE INVENTION

The present invention is generally directed to water dispensing apparatus and, more particularly, to a system and method that facilitates providing heated water for use on the Jewish Sabbath and Holidays, when heating and cooking water is severely restricted by stringent religious laws.

The general subject to which the present invention is directed has been discussed in many prior patents and patent applications including in US patent application publication number US 2007/0261561, the contents of which are incorporated by reference herein. According to the practice of orthodox Jews, one may not perform an act of work on the Sabbath. For example, one may not turn on or off the lights on a Sabbath. However, if the light was turned on before the entry of the Sabbath, one may keep the light on and use it the entire Sabbath, provided one does not turn it off before the Sabbath is over. Similarly, one may use hot water if the water heater was energized prior to the entry of the Sabbath, and the water heater is not turned on or off during the Sabbath in response to actions taken by the user of water. As can be understood, due to the operation of conventional water dispensers, i.e., the refilling and re-heating as hot water is dispensed, Sabbath observers cannot use such dispensers during the Sabbath.

One Sabbath requirement is that refilling and reheating of the hot water reservoir tank is not permitted. Instead, the heating of the water in the hot reservoir tank to maintain the water at a hot temperature is carried out in a modified manner that provides a constant heating to less than the boiling temperature, without reliance on any temperature sensors. Also, because refilling of the hot water tank is forbidden, the dispensing of water must cease while the heating element is still covered by water, to prevent damaging it. Another requirement forbids heating the water to the boiling point. That is, the water is always below about 95° C., preferably in the range of 75 to 85 degrees Centigrade.

While the system of the present invention may be used for water to be consumed by humans, e.g., for coffee, tea and the like, an important aspect of the invention is to provide either hot or warm water for general use including washing dishes, hands and faces or even for showering (although showering on the Sabbath is itself subject to various stringent rabbinical restrictions, and permitted in special situations and manners only).

The background prior art that may elucidate the subject to which the present invention is directed also includes U.S. Pat. Nos. 10,557,876; 10,409,236; 10,295,248; 10,106,011; 9,920,888; 9,863,672; 9,784,417; 9,709,075; 9,666,914; 9,651,243; 9,408,282; 9,321,623; 8,996,188; 8,915,091; 8,844,304; 8,669,501; 8,255,090; 7,974,527; 7,970,264; 7,965,178; 7,672,576; 7,561,977; 6,826,267; and 6,703,591.

The contents of these patents are incorporated by reference herein. More on the subject is provided in US patent publications: 2018/0310748; 2018/0245802; 2017/0208650; 2013/0253725; 2012/0095614; 2009/0103907; 2007/0051819; 2006/0180179 and 2006/0005713, the full contents of which are incorporated by reference herein.

In general, the prior suggests or requires modifying existing hot water systems in homes, which requires a large monetary investment and professional plumbers to install and maintain. The prior art systems that provide hot water urns that comply with the Sabbath requirements and rules are typically standalone urns or water tanks that dispense hot water from a built in water valve or faucet and do not provide the ability to readily mix that water with cold water from a faucet in the one's Kitchen or wash room, in a manner that facilitates washing one's hand, face or dishes or the like.

SUMMARY OF THE INVENTION

Accordingly, it is an object of the present invention to provide a system and method that provides hot and warm water on the Jewish Sabbath in strict adherence to the Sabbath rules.

It is a further object of the invention to provide a system that delivers hot and warm water on the Sabbath in a manner that avoids the drawbacks of the prior art.

It is yet another object of the invention to provide a system that delivers hot and warm water on the Sabbath that is implemented as a "purchase and use" system for the general public without any need for special installation services or altering any plumbing system in one's home, or in a catering hall, or Sabbath compliant hotel or the like.

In accordance with preferred embodiments of the invention, the invention may comprise a water supply system including a main water tank that is configured to store water and includes a heater to heat the stored water to close to but below a boiling temperature thereof, to provide main heated water; a dispenser water tank configured to receive a portion of the main heated water, the dispenser water tank being free of any heating elements capable of adding heat to the water stored therein, and providing dispensable heated water; a water mixer including a first pipe for receiving the dispensable heated water from the dispenser tank and a second pipe for receiving utility water from a faucet that supplies utility-provided water, and the water mixer including a mixing chamber from which the waters from the first pipe and the second pipe are dispensed and/or in which these waters are admixed.

The main heater has a Sabbath mode function that turns on the heater on a Sabbath intermittently, without receiving any input from any temperature sensor. The main tank includes a hand-operated pump for pumping water from the main tank into the dispenser tank. The hand-operated pump includes a rotatable handle to effect pumping of the main heated water. The tank includes wheels to enable it to roll over a floor surface, ant wherein the main tank has a water storage capacity in the range from 5 to 30 gallons. The main tank includes a water supply pipe that has a distal end with an enlarged opening that enables the water supply pipe to be fitted on a water dispensing end of a home utility water faucet and a tightening device that seals a connection between the water supply pipe and the faucet against water leakage. The main tank including a water level gauge. The dispenser tank including legs to raise the height of the dispenser tank above the counter surface of a kitchen adjacent the faucet. The dispenser tank being associated with platform elevator that is configured to elevate the dispenser tank above a kitchen counter surface. The supply system including a canister of pressurized air that is air coupled to an interior of the dispenser tank to pressurize the dispensable heated water, to increase its flow rate from the dispenser tank. The dispenser tank including a water flow valve that is configured to control a flow rate of the dispenser heated water into the water mixer. The dispenser tank including a normally covered access opening that can be uncovered to allow reaching into the dispenser tank to allow interior surfaces inside the dispenser tank to be wiped dry between water filling thereof on the Sabbath.

The supply system including an articulation arm that is configured to be attached at one end thereof to a comparatively immovable object and at a second end thereof to the water mixer, and is configured to hold the water mixer in space suspended over a draining sink. The mixing chamber of the water mixer has an aerator at a water dispending end of the water mixer. The water mixer dispenses the faucet water from the second pipe into the mixing chamber at location below a point of entry of the dispenser heated water into the mixing chamber. The water mixer including a plurality of water nozzles for injecting the faucet water into the mixing chamber. The dispenser tank is cylindrically shaped and configured to be hung from a hook located above a draining sink.

The water supply system might be used without the main tank with the dispenser water tank configured to receive heated water, the dispenser water tank being free of any heating elements capable of adding heat to the water stored therein, and providing dispensable heated water; and a water mixer including a first pipe for receiving the dispensable heated water from the dispenser tank and a second pipe for receiving utility water from a faucet that supplies utility-provided water, and the water mixer including a mixing chamber in which the waters from the first pipe and the second pipe are admixed. The water mixer is integrated and formed to be a part of the dispenser tank.

The foregoing and other objects of the invention are realized in accordance with preferred embodiments of the invention by a hot water dispensing systems that includes:

BRIEF DESCRIPTION OF THE DRAWINGS

FIG. 2a illustrates a stand for the gravity technique of FIG. 2.

FIG. 2b illustrates an air pressure for an embodiment of the present invention.

FIG. 3 illustrates diagrammatically a hot/cold water mixer component of the present invention.

FIG. 3a is a cross section through the mixer component of FIG. 3.

FIG. 3b diagrammatically illustrates an embodiment of the water mixture of FIG. 3.

DETAILED DESCRIPTION OF PREFERRED EMBODIMENTS OF THE INVENTION

Figure 1A:
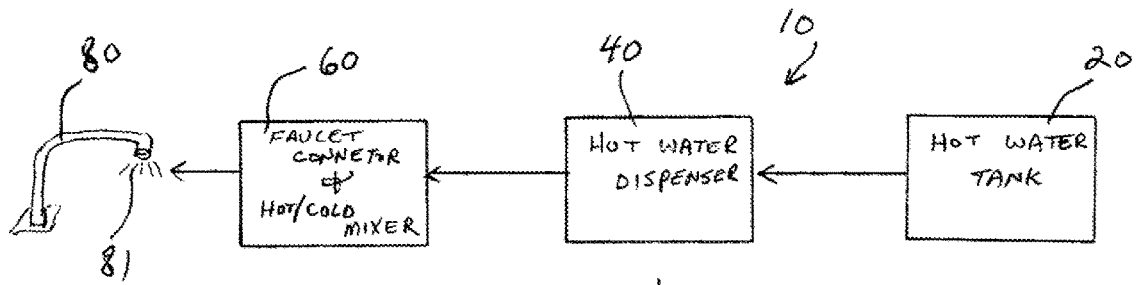
FIG. 1a is a block diagram of system components of the present invention.

Referring to the drawings, FIG. 1a provides an overall block diagram of the system 10 of the invention and identifies its major components including the main hot water tank 20, the hot water dispenser 40 and the faucet adapter/connector and hot/cold water mixer 60. The overall concept and functionality of the system 10 of the present invention is based on the idea that prior to the Sabbath, a large tank of very hot water is preheated and prepared in the hot water tank 20 that can be used on the Sabbath to fill one or more secondary and smaller water dispensers 40 that once filled with the hot water are then moved to the kitchen or washroom/bathroom where the that water can be mixed with cold or room temperature water obtained from the faucets in the kitchen, or the washroom faucet or even with unheated water flowing from a shower head, as described below.

That is, during the Sabbath hot water is manually transferred, as described below, from the hot water tank 20 to the hot water dispenser 40, which dispenser is reasonably portable and can be carried to and placed wherever hot water is needed in one's home. In a typical use of the system 10 of the invention, the hot water dispenser 40 is filled with hot water when needed and then placed next to a faucet in one's kitchen or in a washroom where such water is needed for washing dishes or washing one's hands and face and/or other typical uses of hot water.

Since the water flowing from the hot water tank 20 may be close to the boiling temperature of water, about 95 degrees Centigrade, the invention also provides the mentioned faucet coupling and water mixer 60. The water mixer 60 includes a water pipe (FIG. 3) that can be slipped over the water dispensing end of the faucet 80 and then used to mix the water flows that streams, typically by the force of gravity, from the water dispenser 40 with cold water from the faucet 80, providing a water mix that is reasonably hot or just warm, as desired and as set by the user for the particular use, e.g., washing dishes or washing one's hands and face, or for taking a shower on the Sabbath or Jewish Holiday (adhering of course to the strict limitations imposed by Rabbinical Rules against showering on the Holy days). One steeped in the Jewish Sabbath laws would recognize that the main hot water tank 20 is deemed to be a "cli rishon," a "first vessel" (because it is the vessel in which the water has been heated). Therefore, that water is forbidden being mixed with cold faucet water. The second vessel (which does not have any heating means) is deemed to be a "cli Sheini" (a second vessel). Hence, only water from a "second vessel" is permitted to be mixed with cold (actually "uncooked") water (but not according to some authorities on the Jewish Laws).

Figure 1:
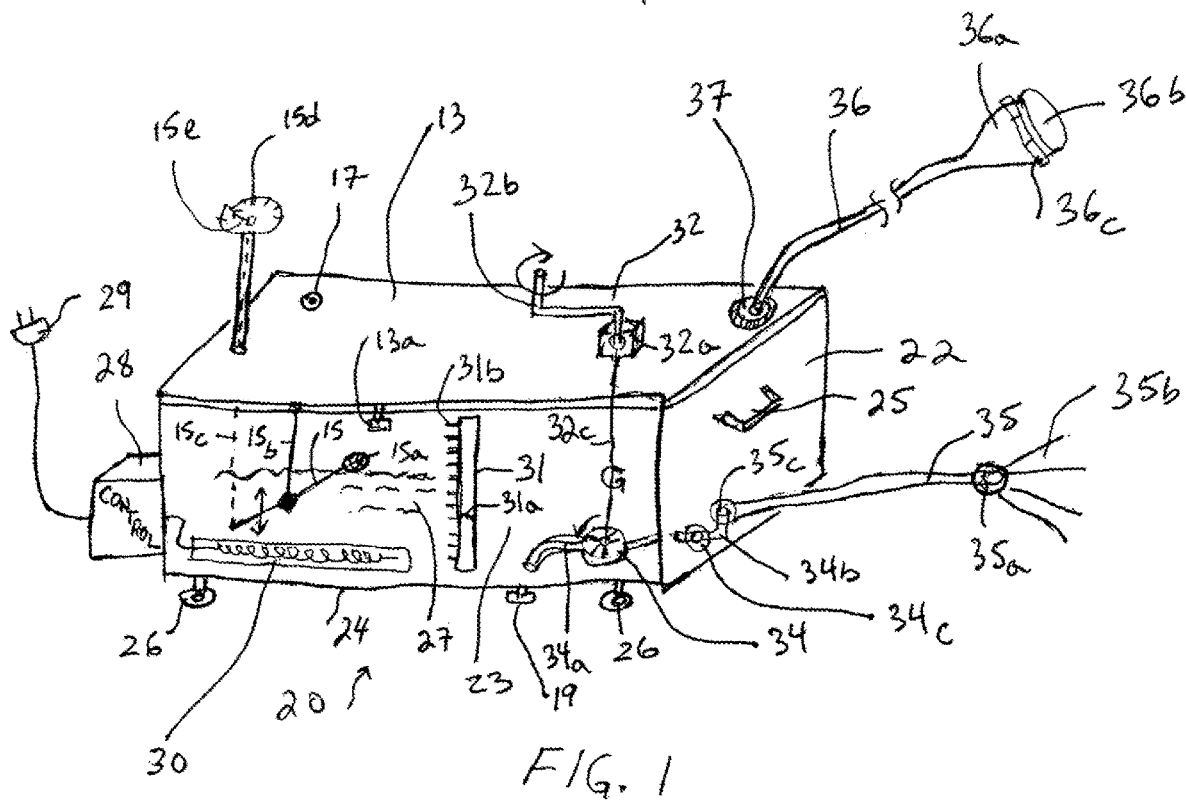
FIG. 1 diagrammatically illustrates hot water tank are the system of the present invention.

With reference to FIG. 1, the main hot water tank 20 is illustrated to be a rectangular container that might hold on the order of 10 to 30 gallons of water, the intention being that this tank will be the source of hot water for an entire family or even for a catering hall or the like. Therefore, the invention contemplates, that when purchasing the system 10 of the invention, one will order the hot water tank 20 with a water holding capacity that suits its particular needs. In the same vein, a consumer may purchase one or several of the hot water dispensers 40 as needed, it being noted that the dispensing tanks 40 hold much less water, on the order of from 2 to about 10 gallons. Incidentally, a gallon of water weighs about 8 pounds, and therefore 10 gallons adds up to over 80 pounds of water, which would make the gravity feeding dispensing tank 40 not particularly portable. Also, while the tanks 20 and 40 are shown to have rectangular shapes, their actual shapes can cylindrical, oval or any shape.

In the illustrated embodiment, the main tank 20 is defined by a plurality of outer walls 22 including a bottom wall 24 that support a plurality of wheels 26 that allow the tank 20 to be rolled along the floor to a desired location, including by holding onto one or more handles 25. The interior of the tank 20 is filled prior to the Sabbath with water 27, that is must be heated prior to the Sabbath to an above scolding temperature, which according to Jewish Halacha must be above about 115 degrees Fahrenheit, so as to be deemed to have been "cooked" before the onset of the Sabbath. During the Sabbath proper, the water in the tank 20 is only permitted to maintain the hot temperature, without ever being raised to a water boiling temperature. To this end, the electrical controller 28, which receives power from the electrical cord 29, controls a heating element 30, which may be comprised of several heating elements for rapid heating of the water prior to the onset of the Sabbath.

To adhere to Halachic requirements, the controller 28 may include internal software that informs the controller of the day and date of the week and a Jewish Holiday calendar to know when cooking of the water is permitted. Alternatively, the controller may have a manual switch that can be set to one position to heat/cook the water prior to the Sabbath, and another position, which is the Sabbath position, which maintain the water at the hot temperature in the range of close to 95 degrees Centigrade, as adequately described in the incorporated by reference background prior art. That is during the Sabbath the controller 28 periodically activates the heating element 30 to maintain the water 27 at the hot temperature without purely on a scheduled basis and without reference to the actual temperature of the water 27.

The water tank 20 may be filled with water prior to the Sabbath through its threaded water inlet 37 that is sized and shaped to receives the free end of the flexible hose 36 that has an opposed enlarged-diameter fitting 36a with an opening 36b what can be slipped over the distal end of the faucet 80, creating a water tight coupling by being ratcheted by the tightening ring 36c. Thereby, by opening the faucet, the tank 20 will fill with water to a desired level that can be observed by viewing the water level indicator described below. This is of course done before the onset of the Sabbath. The water inlet 37 may have built-in vent(s) that allow the internal air to be evacuated. Alternatively, an air vent may be provided elsewhere, as indicated by the air vent 17.

The emptying water valve 19 at the bottom wall 24 allows the tank 20 to be emptied after the Sabbath, as the system of the present invention is typically unneeded except for Sabbath use. Both during the filling operation and when retrieving water on the Sabbath, the water level inside the tank 20 can be observed or read by viewing the water level glass tube 31 that shows the water level 31a juxtaposed to the graduation marks 31b. Without delving to deeply into Halacha, it is known that some rabbinical authorities do not approve of the use of a water tube (because the water in the tube may become heated by internal hotter water). Alternatively therefore, the present invention provides a water level indicating system 15 that complies with the stricter rabbinical authorities in the form of a float 15 including a buoyant ball 15a that uses the fulcrum 15b to allow the opposite side, which is connected to a link 15c, to move up and down depending on the water level. Thereby, the water level is indicated by the angular position of the needle 15e which is located in the glass dial 15d, avoiding the Halachic issue associated with cooled water mixing with hot water. Preferably, the top wall 13 of the tank 20 is constructed to be openable upon releasing the lock 13a to allow access into the interior, for servicing internal parts, cleaning or the like.

The Jewish laws do not permit providing an electrical pump for pumping the water 27 into the dispenser tank(s) 40 on the Sabbath. Theoretically, the large tank 40 may be placed on a shelf at some elevation ant the water withdrawn therefrom from a valve located at the bottom thereof to flow out by gravity, for example when opening a valve 34 and allowing the water to flow out through an outlet pipe 34b. Practically, the tank 20 would be too heavy to be located on a shelf Instead, the invention provides a manual pump system 32 that includes a crank 32b that rotates gears in the gear box 32a, turning the shaft 32c at a high rotational speed and thereby the vanes of the vane pump 34. This will cause the hot water 27 to dispense at great speed and volume by being drawn into the intake pipe 34a (which preferably is located high enough above the bottom of the tank to assure that the heating element 30 is always below the water line to avoid being damaged through overheating. To fill the dispensing tank 40, a feeding flexible pipe 35 has one end fitted over the outlet 34c and the other end 35c coupled to the tank 40. While one type of manual pump has been described, the prior art has described over the years many other types of hand-operated pumps that can be used on the Sabbath to pump the water into the dispensing tank(s) 40, and the description thereof is deemed unnecessary. Similarly, it assumed that the main tank 20 will be surrounded by insulation to save energy. Or, it can use walls made of double panes, vacuum separated, to achieve the desired heat insulation.

Figure 2:
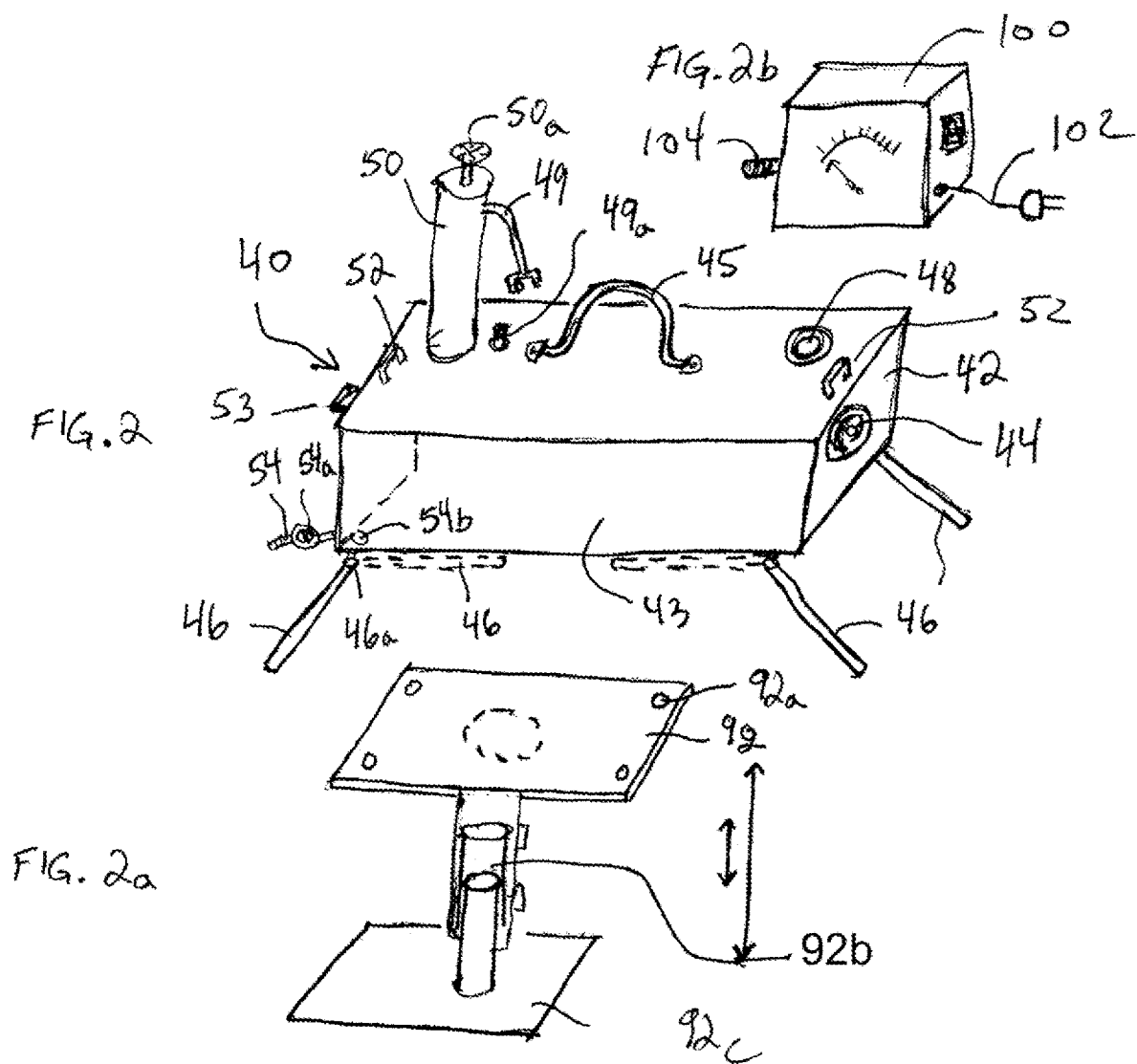
FIG. 2 storage portable gravity hot water tank component of the president pension.

Turning to FIG. 2, the dispenser tank 40 of the present invention is shown in a preferred embodiment to comprise rectangular vessel 42 with an access opening 44 that can be closed with a screw-on cover, to enable reaching inside the tank 40 to wipe it dry using a cloth or the like, which is another Halachic requirement before any hot water may be introduced therein on the Sabbath. The tank 40 is constructed to supply hot water by gravity through an outlet opening 54b located at the bottom wall thereof, via an outlet pipe 54 that is controlled by a water valve 54a. Again, the tank 40 may a shape other than rectangular and may be heat insulated.

The water is introduced into the dispenser tank 40 via an inlet opening 48 that is normally closed off by a screw-on cover that can also incorporate an air vent that releases the internal air during the filling process. In other words, the feeding pipe 35 shown in FIG. 1 can be inserted into the inlet opening 48 (or screwed thereto) during hot water filling. Once filled with water to a desired amount, the tank 40 can be carried by being held by its main handle 45 or by using the side handles 52 to a location in a kitchen or in a washroom where a faucet is provided. Because the water is dispensed by the force of gravity, it is preferred that the dispenser tank 40 be located at an elevation higher than the height of the water egress location. To this end, the tank 40 is preferably supported on fold-able legs 46. Alternatively, the invention provides a variable height platform 92 that is placed underneath the tank 40, with registration openings 92a in the platform 92 receiving projections (not shown) at the bottom of the tank 40, so it will not slide relative to the platform 92. The telescoping structure 92b, which may be controlled by a turning crank (not shown), is attached to a base 92c and allows the height of the platform 92 to be adjusted as needed.

In accordance with a preferred embodiment, the water in the dispensing tank 40 maybe pressurized to flow with greater force through the use of a pressurized air canister 50 that is controlled by a valve 50a and has an air hose 49 that can attach to the pressurized air inlet 49a of the tank 40, to pressurize the water within to flow with greater force (or even flow upwards higher than the tank 40, thereby obviating the need to provide the legs 46 or the platform 92). Typically, an electrically operated prior art air pressurizer 100 that plugs through its electrical cable 102 into a wall outlet produces high pressure air at its outlet 104, which can receive the air hose 49 of the canister to store therein pressurized air. Several canisters 50 can be prepared before the onset of the Sabbath and then used to pressurize the water in the tank 42 to provide a stream of water that flows with greater force.

In accordance with one aspect of the present invention, the hot water made available in the gravity tank 40 is not primarily for drinking, e.g., hot coffee, tea and the like, but rather for washing purposes, e.g., dishes, hands, face, washing a baby or young children and the like. Understandably therefore, the aim is therefore to obtain just warm or moderately hot water, not the extremely hot water made available by the portable tank 40. Furthermore, one aim is to obtain a flowing stream of warm water that flows over and into a kitchen or bathroom sink. To this end, the system 10 of the present invention includes the mentioned faucet coupling and water mixer/blender 60, a preferred embodiment of which is diagrammatically illustrated in FIG. 3. The water blender/mixer 60 includes an interior chamber 61 within which water flowing into the chamber 61 is admixed from a water flow 81 (FIG. 1*a*) that flows from an ordinary kitchen or bathroom faucet 80 (or from a shower head in a shower), providing a combined and more robust water flow of water the temperature of which can be adjusted by the user to her/his desire by controlling the water control knob of the faucet 80.

As more specifically illustrated in FIG. 3, the mixer body 61 has a top to which is attached one end of a support and articulating arm 68 which if formed of several joined arm sections 69*a*, 69*b*, 69*c*, and 69*d* that are interconnected at joints 70 that can be loosened or tightened by a tensioning knob 71. At its end that is attached to the mixer body 61, the arm 68 is fastened via a ball joint 68*a*, thereby allowing the mixer body to be oriented at any angle relative to the articulation arm 68. At its opposed distal end, the arm section 69*a* has stem 71*b* that allows it to be affixed to a stationary anchor via the nut 71*c*. The element 71*a* represents a universal joint. Regardless, by affixing the arm 68 to any stationary member, for example to the hook 53 formed on the gravity tank 40, the rest of the arm and its controls can be used to suspend the mixer body 61 at any position, and at a desired height above a sink (not shown) associated with the faucet 80.

The water supplies to the mixer 60 are provided by the first hose 64 that is attached to the mixer 60 at 64*b*, and by the threaded coupling 64*a* that is configured to be screwed upon the outlet 54 of the tank 40. This supply line provides a flow of very hot water from the tank 40. The second cold water hose 66 is coupled to the mixer 61 at 66*d*, with the opposed end of the second hose 66 having an enlarged (or flexible body) section 66*a* with the opening 66*b* that enables it to be slipped upon the water dispensing end of the faucet 80 with a tight water connection being effected by the tightening band 66*c* (which can have be formed as a ratchet able band). With this arrangement, as the streams of hot and cold water flow into the mixer 60, the mixer delivers a mixed stream of either just warm (or moderately hot) water, the temperature of which can be controlled by the user by controlling the flow knobs on the hot tank 40 and the cold water faucet.

In its simplest form, the mixer chamber 61 can be just a hollow chamber which is bounded at the bottom by an aerator 63. The water streams into the chamber are simply admixed. But in a more elaborate embodiment, the interior of the mixer, as shown in FIG. 3*a*, has a hot pre-chamber 65 that receives the hot water and separates it into hot water streams 65*a* by use of a perforated plate at the bottom thereof. That hot water flowing downward is met by sidewise and downward directed shooting cold water jets that emanate from the annular chamber 81 that has downward directed nozzles 81*b* (FIG. 3*b*), producing a downward acceleration (particularly since the cold water, which is pressurized, has a comparatively much greater speed flow). This not only thoroughly mixes the two water streams, but also creates a lower pressure that speeds up the water flow from the gravity tank 40 (which is assumed not to be pressurized by use of any pressurized air canister). In addition, in the above arrangement the water in the pre-chamber could be deemed to emanate from a "cli Shelishi" (a third vessel), which should remove any objection to the use of the present invention, even according to the stricter Authorities.

Many variations and additional features can be adopted and implemented in relation to the system of the present invention, without departing from its theme of providing water at elevated temperature to Sabbath observers. Thus, the gains from having the hot water tanks 20 and 40 formed from or encased in heat insulation material is obvious. The second tank 40 can be made from plastic or very thin walled metal to reduce its weight. It can be in the shape of a cylinder with a catch/cable at one end by which the tank 40 can be suspended from a hook at the ceiling or bracket attached to high point in the kitchen or wash room, generally above the sink.

In accordance with another embodiment, a smaller sized tank 20 (to reduce its size) can be located on the kitchen counter with the second tank 40 placed atop the first tank 20, the water pump hose being attached therebetween and water being hand-pumped (as must be the case on the Sabbath) upwards and into the dispensing tank 40, when and just in the amount needed for the next washing or water use event. While a vane based hand pump has been described above, there are many other known hand pump, including as described in U.S. Pat. No. 8,403,033, the contents of which are incorporated by reference herein.

It should be noted that whenever it is possible to place the dispensing tank elevationally-below the main tank 20, then the hand pump may not be needed, as the dispensing tank 40 could be filled by gravity flow of hot water from the main into the dispensing tank 40.

In accordance with another concept of the present invention, some users may do without the main tank 20. Thus, as in known, the Sabbath commences Fridays at sun down. Therefore, some user may fill the dispenser tank 40 (which for this purpose is well insulated) with very hot faucet water just before sunset and then use in Friday night to wash the dishes from that meal, by using just the water mixer 60 to obtain the just correct water temperature needed for dish washing Friday night. Indeed, if superbly insulated dispenser tanks are used, several could be filled just before the Sabbath and the water stored therein used throughout the Sabbath, i.e., over a period of about 24 hours.

Figure 4:
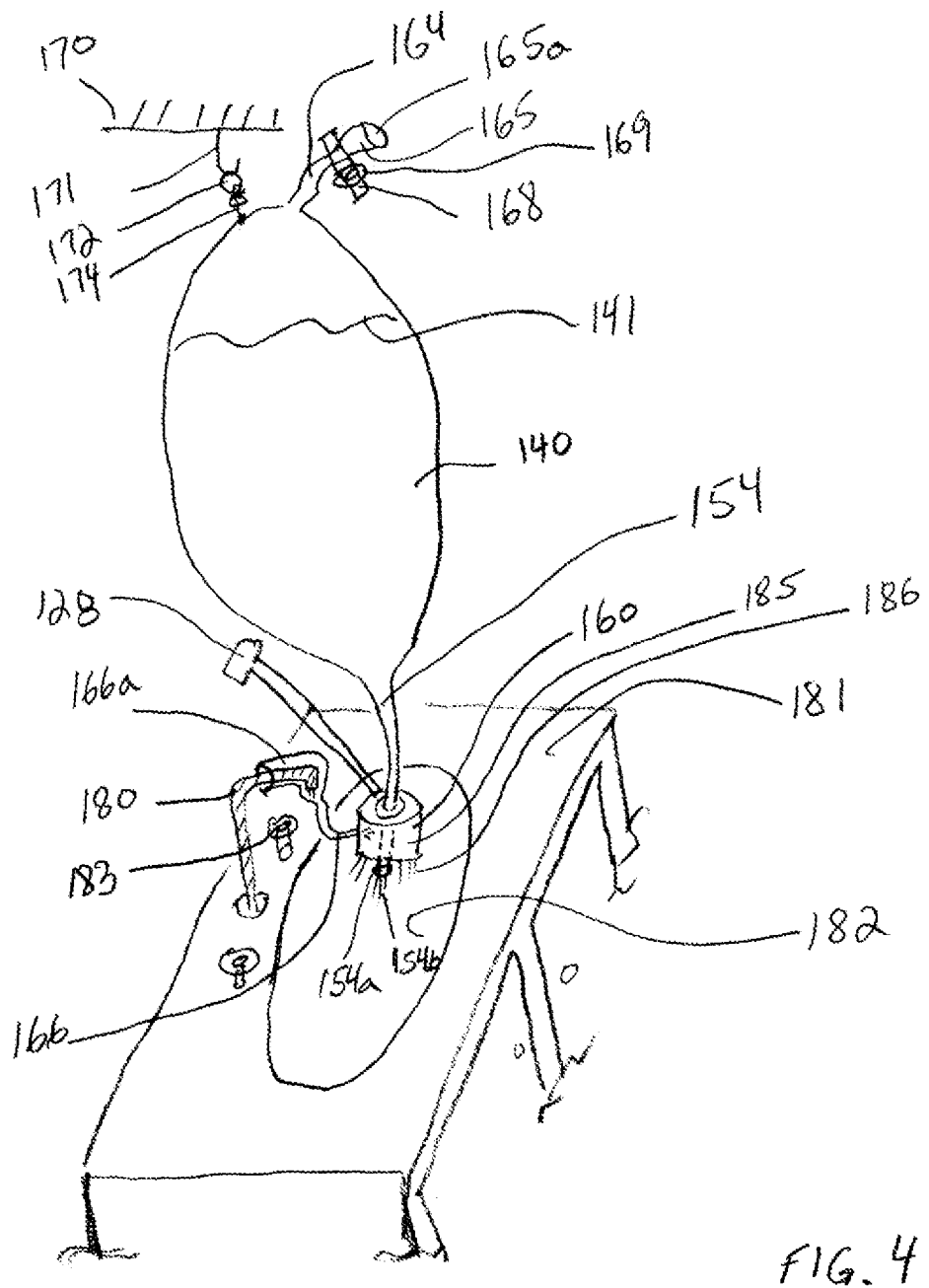
FIG. 4 diagrammatically illustrates another embodiment of the water dispenser, with an attached tap water mixer.

In the embodiment of FIG. 4, the hot water dispenser tank 140 is suspended from the ceiling or high point 170, from a hook 171 that holds a holding ring 172 that is attached by a rope 174 to the tank 104. In use, the tank 140 is loaded with hot water via inlet pipe 164 that has a wider diameter section 165 with an opening 1365*a*. After being filled with hot water the tank 140 is carried to the sink 181 and hung from the hook 171, so that the outlet pipe 154 of the tank 140 dangles above the sink 186. The water level in the tank 140 is indicated by numeral 141.

The outlet pipe 254 can be coupled to the previously described water mixer. But in the present embodiment, the outlet pipe extends through the water mixer 160 and sprays its water through the outlet nib 154*a*, producing a hot water spray 154*b*. Meanwhile the distal end of the outlet 154 is surrounded by an annular chamber 185 the interior of which is supplied with cold tap water from the faucet 180, vial the tap water supply pipe 166 that has the widened section 166*a* that is water tight coupled to the outside surface of the faucet spout as previously described. Or, the section 166*a* is made of highly stretchable plastic or rubber, similar to the spout of a playing balloon. When the cold water knob is opened the stream of cold tap water enters the chamber 185 and exits the mixer 160 in the form of an annular stream 186 of cold water that surrounds the hot water 154*b* outside the mixer 160. When placing one's hands under the combined cold/hot water the temperature felt will be determined by the amounts of hot and water being delivered, which is set by the user as previously described. The support arm 128 may also be used in the manner of the support arm 68 shown in FIG. 3 to suspend the mixer 160 in midair at a desired location relative to the sink 182.

Figure 5:
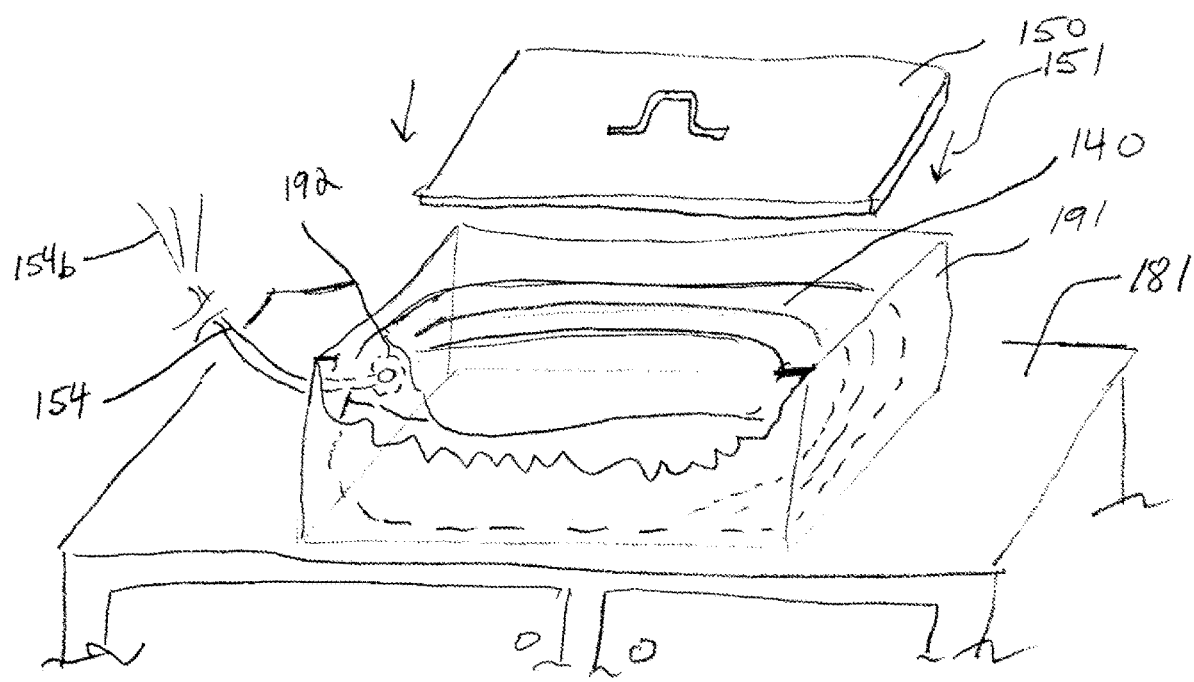
FIG. 5 illustrates another mechanism for pressurizing the water in the water dispenser.

In the embodiment of FIG. 5, the dispenser tank 140 is generally similar to that of FIG. 4, but the outer skin of the tank is made of a water proof cloth, or rubber or other synthetic material that is allows the interior water to be squeezed out of the tank 140 for the purpose described immediately below. That is the tank 140 is placed, after being filled with hot water, inside a rigid body container 191, which container is located on the countertop 181 (next to the sink 182 shown in FIG. 4). The outlet 154 is threaded outside the container 191 through a side opening 192. The top of the container is open and a heavy flat rectangular presser 150 is placed and rested directly atop the soft bodied dispenser tank 140 applying a strong downward force 151 thereto and pressurizing the hot water inside. This allows the water inside to shoot outward, and even upwards, as indicated by 154*b*. Thus, though the tank is located at the height of the countertop, its internal water can be directed into the mixer 160 even should the mixer be located higher than the tank. Also, the hot water flow rate can be set higher (using the outlet knob previously described). That is, owing to the water being pressurizing a more vigorous overall water flow can be obtained for washing dishes and the like. The presser 150 may be implemented as a mechanical presser that is pushed by a ratcheting crank with great force against the tank 140.

All the embodiments and concepts herein can also be deployed for use in a shower stall as already noted. In a conceived system, customers may purchase several dispensers 40, 140 of different water capacities for using for different purposes. The dispensers may be filled from a hot water faucet before the Sabbath and placed inside an insulated box for use hours later during the Sabbath.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hot water supply system that is compliant with Jewish Sabbath strictures, the system including:

a main water tank that is configured to store water and includes a heater to heat the stored water to close to but below a boiling temperature thereof, to provide main heated water;

a dispenser water tank configured to receive a portion of the main heated water, the dispenser water tank being free of any heating elements capable of adding heat to the water stored therein, and providing dispensable heated water;

a water mixer including a first pipe for receiving the dispensable heated water from the dispenser tank, while the dispenser water tank is physically separated from the main water tank, and a second pipe having a first end that is connectible to the water mixer and a second end that is configured to be attached to a faucet that supplies utility-provided water, and the water mixer including a mixing chamber from which the waters from the first pipe and the second pipe are dispensed for being used by a user.

2. The supply system of claim 1, in which the main heater has a Sabbath mode function that turns on the heater on a Sabbath intermittently, without receiving any input from any temperature sensor.

3. The supply system of claim 1, wherein the main tank includes a hand-operated pump for pumping water from the main tank into the dispenser tank.

4. The supply system of claim 3, wherein the hand-operated pump includes a rotatable handle to effect pumping of the main heated water.

5. The supply system of claim 2, wherein the main tank includes wheels to enable it to roll over a floor surface, and wherein the main tank has a water storage capacity in the range from 5 to 30 gallons.

6. The supply system of claim 2, the main tank including a water supply pipe that has a distal end with an enlarged opening that enables the water supply pipe to be fitted on a water dispensing end of a home utility water faucet and a tightening device that seals a connection between the water supply pipe and the faucet against water leakage.

7. The supply system of claim 1, the main tank including a water level gauge.

8. The supply system of claim 1, the dispenser tank including legs to raise the height of the dispenser tank above the counter surface of a kitchen adjacent the faucet.

9. The supply system of claim 1, the dispenser tank being associated with platform that is configured to elevate the dispenser tank above a kitchen counter surface.

10. The supply system of claim 1, including a canister of pressurized air that is air coupled to an interior of the dispenser tank to pressurize the dispensable heated water, to increase its flow rate from the dispenser tank.

11. The supply system of claim 1, the dispenser tank including a water flow valve that is configured to control a flow rate of the dispenser heated water into the water mixer.

12. The supply system of claim 1, the dispenser tank including a normally covered access opening that can be uncovered to allow reaching into the dispenser tank to allow interior surfaces inside the dispenser tank to be wiped dry between water filling thereof on the Sabbath.

13. The supply system of claim 1, including an articulation arm that is configured to be attached at one end thereof to a comparatively immovable object and at a second end thereof to the water mixer, and is configured to hold the water mixer in space suspended over a draining sink.

14. The supply system of claim 13, wherein the mixing chamber of the water mixer has an aerator at a water dispensing end of the water mixer.

15. The supply system of claim 13, wherein the water mixer dispenses the faucet water from the second pipe into the mixing chamber at location below a point of entry of the dispenser heated water into the mixing chamber.

16. The supply system of claim 13, the water mixer including a plurality of water nozzles for injecting the faucet water into the mixing chamber.

17. The supply system of claim 13, wherein the dispenser tank is cylindrically shaped and configured to be hung from a hook located above a draining sink.

18. The supply system of claim 1, in which the mixing chamber is configured so that the waters from the first and second pipes are admixed in the mixing chamber.

19. A hot water supply system that is compliant with Jewish Sabbath strictures, the system including:
- a stand-alone dispenser water tank configured to hold heated water, the dispenser water tank being free of any heating elements capable of adding heat to the water stored therein, and providing dispensable heated water; and
- a water mixer including a first pipe for receiving the dispensable heated water from the stand-alone dispenser tank and a second pipe having a first end that is connectible to the water mixer and a second end that is configured to be attached to a faucet for receiving utility-provided water, and the water mixer including a mixing chamber in which the waters from the first pipe and the second pipe are admixed.

20. The hot water supply system of claim 19, wherein the water mixer is integrated and formed to be a part of the dispenser tank.

\* \* \* \* \*